US012780092B2

(12) United States Patent
Schumacher et al.

(10) Patent No.: US 12,780,092 B2
(45) Date of Patent: Nov. 3, 2026

(54) LIGHTING SYSTEM FOR A VEHICLE, METHOD OF OPERATING A LIGHTING SYSTEM, AND VEHICLE

(71) Applicant: Ford Global Technologies, LLC, Dearborn, MI (US)

(72) Inventors: Max Anton Schumacher, Cologne (DE); Rodrigo Mendes de Oliveira, Cologne (DE); Axel Morawietz, Bergheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 18/731,592

(22) Filed: Jun. 3, 2024

(65) Prior Publication Data

US 2025/0010790 A1 Jan. 9, 2025

(30) Foreign Application Priority Data

Jul. 4, 2023 (DE) ........................ 102023117659.5

(51) Int. Cl.

| | |
|---|---|
| ***B60Q 3/85*** | (2017.01) |
| ***B60Q 3/54*** | (2017.01) |
| ***H05B 47/165*** | (2020.01) |

(52) U.S. Cl.

CPC ................ *B60Q 3/85* (2017.02); *B60Q 3/54* (2017.02); *H05B 47/165* (2020.01); *B60Q 2500/30* (2022.05)

(58) Field of Classification Search

CPC ........ B60Q 3/85; B60Q 3/54; B60Q 2500/30; B60Q 3/208; B60Q 3/80; H05B 47/165; H05B 47/105; H05B 47/196

See application file for complete search history.

(56) References Cited

U.S. PATENT DOCUMENTS

| | | | | |
|---|---|---|---|---|
| 4,968,895 | A | 11/1990 | Leclercq | |
| 5,149,187 | A | 9/1992 | Matsuno et al. | |
| 7,800,483 | B2 | 9/2010 | Bucher | |
| 9,358,922 | B2 | 6/2016 | Rogge | |
| 2020/0247315 | A1* | 8/2020 | Foutis | B60Q 1/04 |
| 2020/0384240 | A1 | 12/2020 | Linder et al. | |
| 2024/0166127 | A1* | 5/2024 | Wang | B60Q 9/00 |

FOREIGN PATENT DOCUMENTS

| | | | |
|---|---|---|---|
| CN | 209893241 | U | 1/2020 |
| WO | 0160659 | A1 | 8/2001 |

* cited by examiner

*Primary Examiner* — Daniel D Chang
(74) *Attorney, Agent, or Firm* — Vichit Chea; Price Heneveld LLP

(57) ABSTRACT

A lighting system for a vehicle having at least one lamp device arranged in the region of an interior roof lining of the vehicle. The at least one lamp device is arranged such that a work region is defined by at least a first vehicle row of the vehicle is illuminable by the at least one lamp device. The lighting system comprises a closed-loop lighting system control device which is coupled to a closed-loop vehicle control device of the vehicle and configured to receive vehicle state information from the closed-loop vehicle control device. The lighting system is configured, in a lighting mode of the lighting system, to automatically terminate an illumination of the work region on the basis of received vehicle state information.

20 Claims, 3 Drawing Sheets

LIGHTING SYSTEM FOR A VEHICLE, METHOD OF OPERATING A LIGHTING SYSTEM, AND VEHICLE

CROSS-REFERENCE TO RELATED APPLICATION

This application claims foreign priority benefits under 35 U.S.C. § 119 (a)-(d) to German Application No. 102023117659.5 filed Jul. 4, 2023, which is hereby incorporated by reference in its entirety.

FIELD OF THE DISCLOSURE

The present disclosure generally relates to vehicle interior lighting, and more particularly relates to a lighting system for a vehicle, to a method for operating a lighting system, and to a vehicle having a lighting system.

BACKGROUND OF THE DISCLOSURE

Motor vehicles often comprise lamp devices arranged in the vehicle interior which typically provide a basic illumination of the interior. Many vehicle interior lamp devices generally do not provide lighting conditions comparable to those provided at an office workplace, for example.

Additionally, vehicle interior lamp devices are typically activated and deactivated manually by a vehicle user. The light emissions emitted by the lamp device may influence the vehicle user. Manual actuation of the lighting device is typically required to prevent the light emissions.

It would be desirable to provide vehicle interior lighting which under specific preconditions reduces the possibility of the vehicle user being influenced and which provides enhanced user comfort at the same time.

SUMMARY OF THE DISCLOSURE

According to a first aspect of the present disclosure, a lighting system for a vehicle has at least one lamp device arranged in a region of an interior roof lining of the vehicle. The lamp device is arranged such that at least one work region defined by at least a first vehicle row of the vehicle is illuminable by the at least one lamp device. The lighting system comprises a closed-loop lighting system control device which is coupled to a closed-loop vehicle control device of the vehicle and configured to receive vehicle state information from the closed-loop vehicle control device. The lighting system is configured, in a lighting mode of the lighting system, to automatically terminate an illumination of the work region on the basis of received vehicle state information.

Embodiments of the first aspect of the present disclosure can include any one or a combination of the following features:

- the closed-loop lighting system control device automatically terminates an illumination of the at least one work region if, on the basis of the received vehicle state information, a vehicle speed of the vehicle greater than a predetermined first speed threshold value is identifiable by the closed-loop lighting system control device;
- at least one lamp device is arranged and configured such that an illuminance of at least 400 lux is ensured for the at least one work region;
- at least one additional work region in the vehicle is illuminable by the at least one lamp device;
- the lighting system comprises a human machine interface, wherein the lighting system is configured such that, in the lighting mode of the lighting system, an illumination of the at least one work region by the at least one lamp device is re-activatable on the basis of a user input received by the human machine interface;
- the illumination of the at least one work region is only re-activatable if, on the basis of vehicle state information received by the closed-loop lighting system control device, a vehicle speed of the vehicle less than a predetermined second speed threshold value is identifiable;
- the lighting mode of the lighting system is activatable on the basis of a user input received by the human machine interface and/or on the basis of received vehicle state information; and
- the lighting mode is deactivatable on the basis of received vehicle state information.

According to a second aspect of the present disclosure, a vehicle includes an interior roof lining having a region, a first vehicle row defining a work region defined by at least the first vehicle row of the vehicle, a closed-loop vehicle control device, and a lighting system. The lighting system has a lamp device arranged in the region of an interior roof lining of the vehicle such that a work region is illuminable by the lamp device and a closed-loop lighting system control device coupled to the closed-loop vehicle control device and configured to receive vehicle state information from the closed-loop vehicle control device. The lighting system is configured, in a lighting mode of the lighting system, to automatically terminate an illumination of the work region on the basis of received vehicle state information.

Embodiments of the first aspect of the present disclosure can include any one or a combination of the following features:

- the closed-loop lighting system control device automatically terminates an illumination of the work region if, on the basis of the received vehicle state information, a vehicle speed of the vehicle greater than a predetermined first speed threshold value is identifiable by the closed-loop lighting system control device;
- the lamp device is arranged and configured such that an illuminance of at least 400 lux is ensured for the work region;
- at least one additional work region in the vehicle is illuminable by the lamp device;
- the lighting system comprises a human machine interface, wherein the lighting system is configured such that, in the lighting mode of the lighting system, an illumination of the work region by the at least one lamp device is re-activatable on the basis of a user input received by the human machine interface;
- the illumination of the work region is only re-activatable if, on the basis of vehicle state information received by the closed-loop lighting system control device, a vehicle speed of the vehicle less than a predetermined second speed threshold value is identifiable;
- the lighting mode of the lighting system is activatable on the basis of a user input received by the human machine interface and/or on the basis of received vehicle state information; and
- the lighting mode is deactivatable on the basis of received vehicle state information.

The present disclosure also includes a method for operating a lighting system for a vehicle. The lighting system has at least one lamp device arranged in a region of an interior roof lining of the vehicle. The lighting system comprises a closed-loop lighting system control device which is coupled to a closed-loop vehicle control device of the vehicle. The method includes the following steps:

illuminating at least one work region defined by at least a first vehicle row of the vehicle in a lighting mode of the lighting system;

transmitting vehicle state information from the closed-loop vehicle control device to the closed-loop lighting system control device; and automatically terminating the illumination of the at least one work region in the lighting mode of the lighting system on the basis of the received vehicle state information.

Embodiments of the method provided in the present disclosure can include any one or a combination of the following features:

the closed-loop lighting system control device automatically terminates an illumination of the work region if, on the basis of the received vehicle state information, a vehicle speed of the vehicle greater than a predetermined first speed threshold value is identifiable by the closed-loop lighting system control device;

the lamp device is arranged and configured such that an illuminance of at least 400 lux is ensured for the work region; and the lighting system comprises a human machine interface, wherein the lighting system is configured such that, in the lighting mode of the lighting system, an illumination of the work region by the at least one lamp device is re-activatable on the basis of a user input received by the human machine interface.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
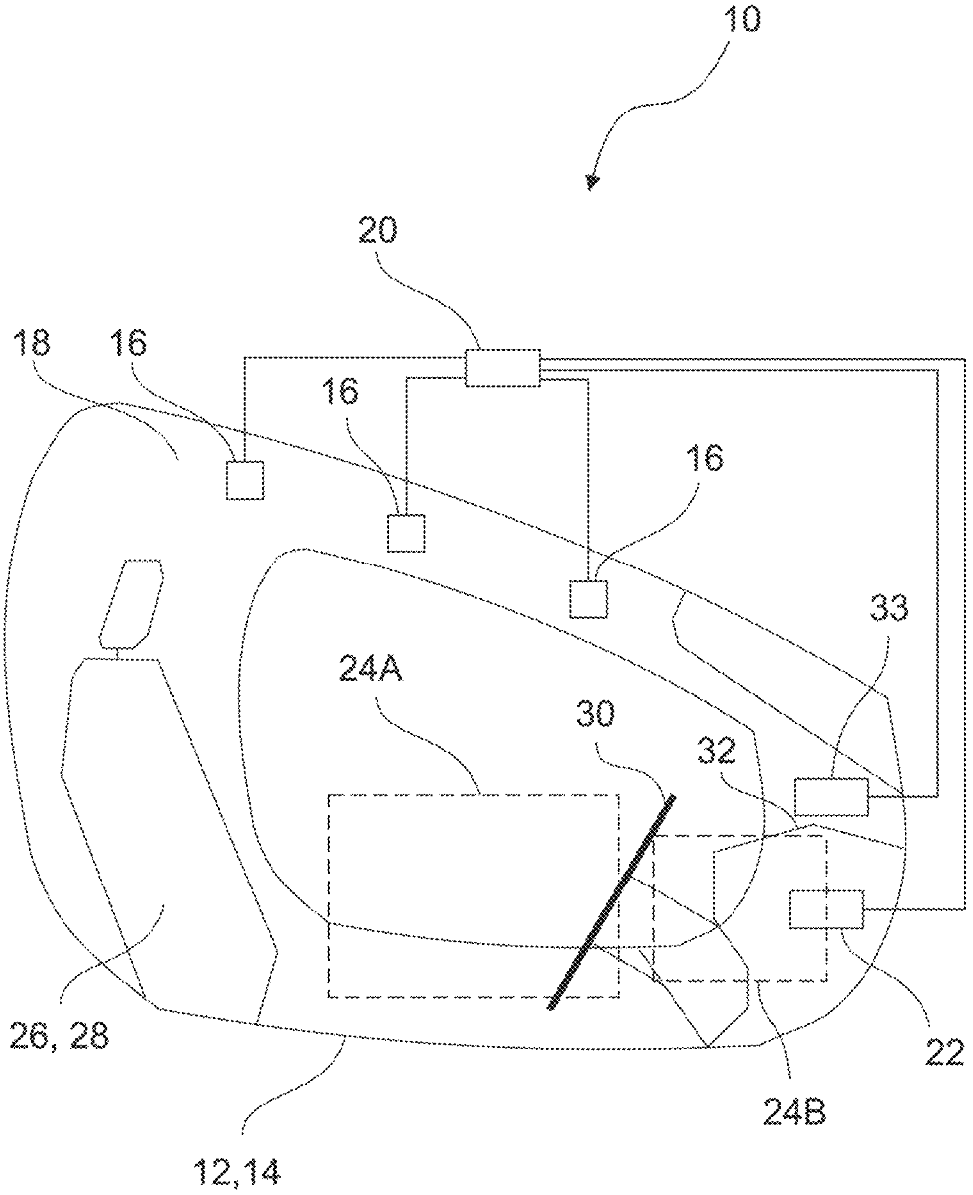
FIG. 1 is a simplified schematic illustration of a lighting system as part of a vehicle according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms “upper,” “lower,” “right,” “left,” “rear,” “front,” “vertical,” “horizontal,” and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a lighting system for a vehicle, a vehicle, and a method for operating a lighting system for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term “and/or,” when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element.

The present application may refer to amounts and numbers. Unless expressly stated otherwise, such amounts and numbers should not be considered limiting but should be considered examples of the possible amounts or numbers in the context of the present application. In this context, the present application might also use the phrase “a plurality of” in order to refer to an amount or number. In this context, the phrase “a plurality of” should be in any number greater than one, e.g., two, three, four, five, etc. The terms “around”, “approximately”, “near”, etc. mean plus or minus 5% of the value specified.

The terms “substantial,” “substantially,” and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

FIG. 1 shows a simplified schematic illustration of a lighting system 10 as part of a vehicle 12, such as a motor vehicle, according to one embodiment of the present disclosure. The illustration shows a part of the interior of the vehicle 12 through a lateral window frame 14 of the vehicle 12.

According to this embodiment, the lighting system 10 comprises a plurality of lamp devices 16 arranged in the region of an interior roof liner 18. The lighting system 10 also comprises a closed-loop lighting system control device 20 which is coupled to the individual lamp devices 16.

In addition, the closed-loop lighting system control device 20 is coupled to a closed-loop vehicle control device 22. The coupling between the closed-loop lighting system control device 20 and the closed-loop vehicle control device 22 is such that vehicle state information is transmittable from the closed-loop vehicle control device 22 to the closed-loop lighting system control device 20.

The lamp devices 16 are arranged in the region of the interior roof lining 18 such that they are configured to illuminate a first work region 24A. In this case, the first work region 24A is defined geometrically relative to a first vehicle row 26, one vehicle place 28 of which is shown in the present example.

As an alternative to that or in addition, the lamp devices 16 can also be arranged in the region of the interior roof lining 18 such that a plurality of work regions 24A, 24B are illuminable. For example, a second work region 24B can be illuminable by the lamp devices 16. In this example, the second work region 24B is defined geometrically in relation to a steering wheel 30 and/or an instrument panel 32 in the vehicle 12.

In the present example, the lamp devices 16 are configured to ensure an illuminance of at least 400 lux in the respective work regions 24A, 24B.

According to this embodiment, the lighting system 10 also comprises a human machine interface 33, on the basis of which user inputs can be received and are transmittable to the closed-loop lighting system control device 20. For example, the human machine interface 33 can be used to reactivate an illumination of the at least one work region 24A as soon as the illumination was automatically terminated by the closed-loop lighting system control device 20.

Figure 2:
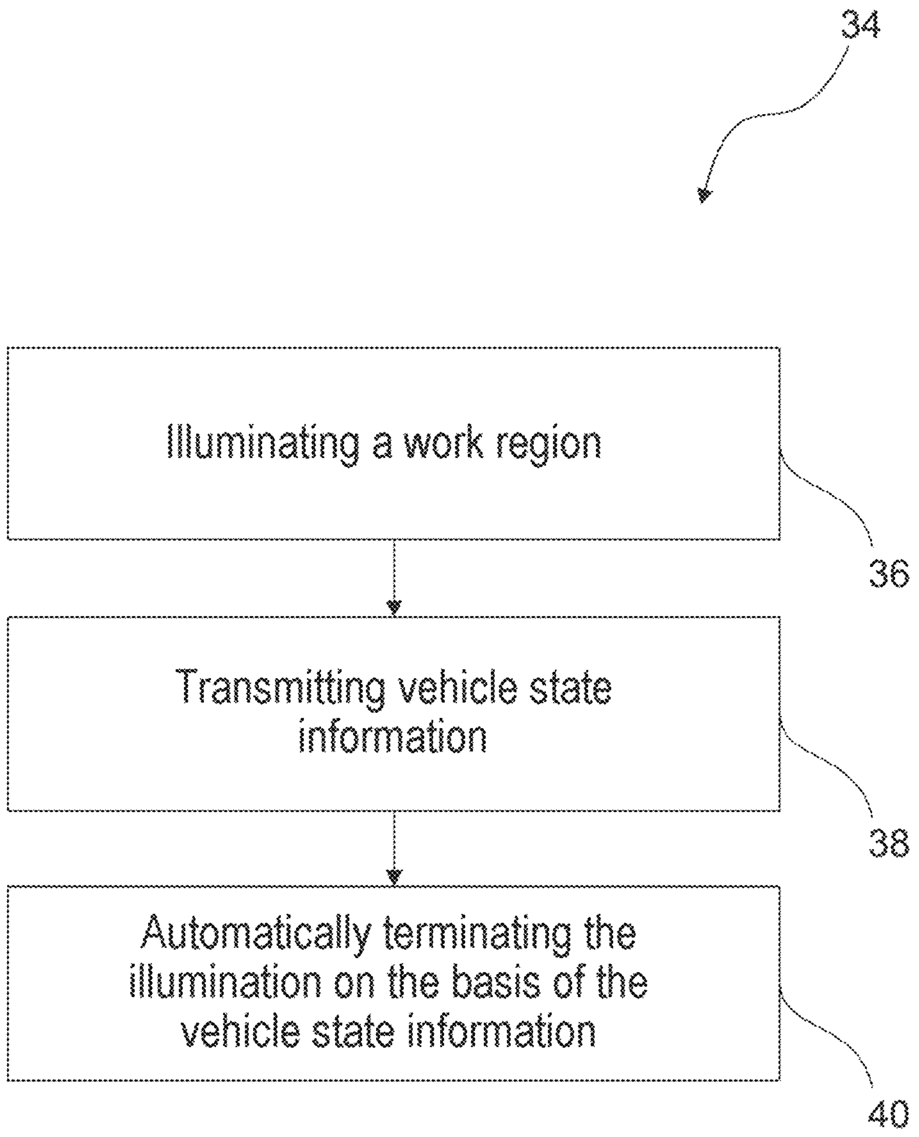
FIG. 2 is a simplified schematic illustration of a method for operating the lighting system according to one embodiment.

FIG. 2 shows a simplified schematic illustration of a method 34 for operating the lighting system 10 according to one embodiment of the present disclosure. In step 36 of the method 34, a first work region 24A defined by at least a first vehicle row 26 of the vehicle 12 is illuminated in a lighting mode of the lighting system 10. In step 38 of the method 34, vehicle state information is transmitted from the closed-loop vehicle control device 22 to the closed-loop lighting system control device 20. In step 40 of the method 34, the illumination of the at least one work region 24A is terminated automatically in the lighting mode of the lighting system 10 on the basis of the received vehicle state information.

According to this embodiment, the vehicle state information in particular comprises vehicle state information relating to an ignition status of the vehicle 12 and a vehicle speed in the present case. The corresponding vehicle state information can be detected or determined on the basis of sensors in the vehicle 12. The closed-loop lighting system control device 20 can use this vehicle state information that it received to determine whether the illumination should be terminated automatically. For example, this is the case if the vehicle speed of the vehicle 12 exceeds a predetermined first speed threshold value. In an alternative, the illumination of the at least one work region 24A can be terminated automatically if the received vehicle state information only contains inadmissible vehicle state information in respect of the ignition status of the vehicle 12 or if the vehicle state information comprises no information about the ignition status of the vehicle 12. Reference is made to state table 1 in respect of the control logic applied by the closed-loop lighting system control device 20.

The method 34 advantageously automatically terminates an illumination of the first work region 24A if certain vehicle configurations are present. For these vehicle configurations, this method 34 helps a user of the vehicle 12 from being influenced by light emissions emitted by the lamp devices 16.

Figure 3:
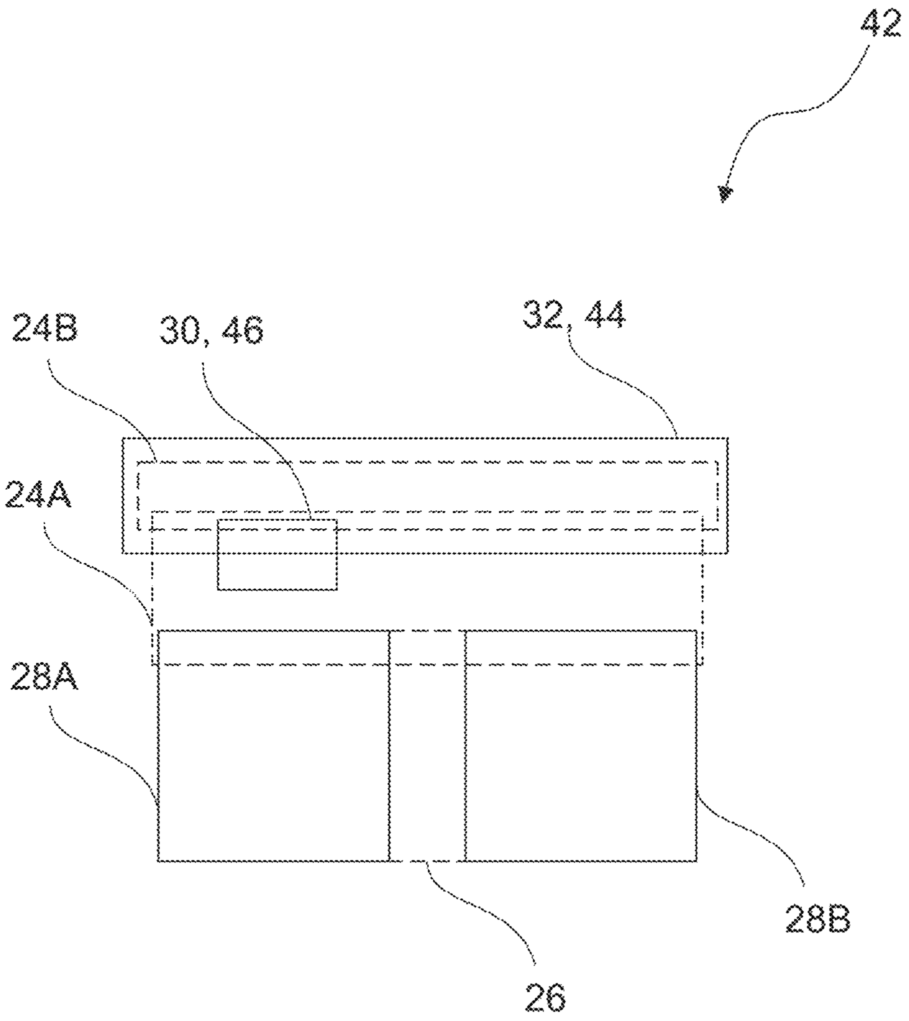
FIG. 3 is a simplified schematic illustration of spatial regions of a vehicle in the context of the lighting system according to one embodiment.

FIG. 3 shows a simplified schematic illustration of spatial regions 42 of a vehicle 12 in the context of the lighting system 10 according to one embodiment of the present disclosure. According to this embodiment, the first vehicle row 26 comprises a first vehicle place 28A and a second vehicle place 28B arranged laterally to its side. In this case, the first vehicle row 26 is the vehicle row with the shortest distance from a front of the vehicle 12 in the forward direction of the vehicle 12.

The position of the first vehicle row 26 defines a first work region 24A in respect of its spatial arrangement. Additionally, the vehicle 12 comprises an instrument panel 32 which defines an instrument panel region 44. In the present example, the vehicle 12 also comprises a steering wheel 30 which defines steering wheel region 46.

As a consequence, a second work region 24B is geometrically defined by the instrument panel region 44 and/or the steering wheel region 46 according to this embodiment. The lamp devices 16 of the lighting system 10 are arranged within the interior roof lining 18 such that they can illuminate at least the first work region 24A and optionally also the second work region 24B in the present case. Naturally, the vehicle 12 may also comprise further work regions 24.

Certain embodiments disclosed herein, especially the closed-loop lighting system control device 20 and the closed-loop vehicle control device 22 use circuits (e.g., one or more circuits) in order to implement standards, protocols, methods or technologies disclosed herein, functionally couple two or more components, create information, process information, analyze information, create signals, encode/decode signals, convert signals, transmit and/or receive signals, control other apparatuses, etc. Any type of circuitry can be used.

In an embodiment, circuitry such as the closed-loop lighting system control device 20 and the closed-loop vehicle control device 22 comprises, inter alia, one or more data processing devices such as a processor (e.g., a microprocessor), a central processor unit (CPU), a digital signal processor (DSP), an application-specific integrated circuit (ASIC), a field-programmable gate array (FPGA), a systemon-a-chip (SoC) or the like, or any combination thereof, and may comprise discrete digital or analog circuit elements or electronics or combinations thereof. In an embodiment, the circuitry comprises hardware circuitry implementations (e.g., implementations in analog circuits, implementations in digital circuits and the like or combinations thereof).

In an embodiment, circuits comprise combinations of circuits and computer program products with software or firmware instructions, which are stored on one or more computer-readable memories and interact in order to cause an apparatus to implement one or more of the protocols, methods or technologies described herein. In an embodiment, the circuit technology comprises circuits such as, e.g., microprocessors or parts of microprocessors which require software, firmware and the like for operational purposes. In an embodiment, the circuits comprise one or more processors or parts thereof, and the associated software, firmware, hardware and the like.

Advantageous configurations of a lighting system, a vehicle, and a method are specified in the description, with each configuration being able to represent aspects of the disclosure, either on their own or in (sub-) combinations. Some features are explained in relation to devices or systems, and others in relation to methods. These aspects should be transferred reciprocally in corresponding fashion.

According to one aspect, some embodiments relate to a lighting system for a vehicle. The lighting system comprises at least one lamp device which is arranged in the region of an interior roof lining of the vehicle and arranged such that at least one work region defined by at least a first vehicle row of the vehicle is illuminable by the at least one lamp device. The lighting system comprises a closed-loop lighting system control device which is coupled to a closed-loop vehicle control device of the vehicle and configured to receive vehicle state information from the closed-loop vehicle control device. The lighting system is configured, in a lighting mode of the lighting system, to automatically terminate an illumination of the work region on the basis of received vehicle state information.

This creates a lighting system which can prevent an illumination of a part of the vehicle interior in a lighting mode for specific vehicle states. This thus ensures that for the relevant vehicle states, the vehicle user is less likely to be influenced by lighting due to the lamp device. In addition, the lighting system lamp device is arranged in such a way that, in particular, the work region defined by the first vehicle row in terms of its spatial arrangement is illuminable. The lighting system also ensures that the work region illumination is able to be terminated automatically. Thus, a user input is not required to terminate the illumination of the work region. This enhances the user comfort for users of the first vehicle row in the vehicle.

In the present case, the interior roof lining can be understood to mean in particular an interior trim, or a delimitation thereof, arranged vertically at the top. Portions of window trims arranged vertically at the top are also associated with the interior roof lining in the present case. Expressed differently, the interior roof lining can comprise the region of the interior trim of the vehicle which is arranged in the head region or above the head region of the user in the normal body posture of a vehicle user.

In the present case, the first vehicle row can be understood to mean the vehicle row which has the shortest distance from a vehicle front when the vehicle has a straight alignment.

A vehicle row typically comprises a plurality of vehicle places typically having seating for people. A workspace of this person is defined in relation to the vehicle place of the vehicle row, in accordance with the posture of a person arranged in a vehicle place. In this sense, the workspace can be considered in terms of its spatial arrangement to be the portion of the vehicle interior within which a person arranged in a vehicle place would typically carry out activities, for example office activities such as writing, reading, activities with regards to the use of a mobile apparatus, for instance a laptop, or the like.

The closed-loop vehicle control device can be understood to mean a device which senses, determines or receives state information regarding the vehicle. Typically, the closed-loop vehicle control device is coupled to a vehicle bus system, by use of which it is indirectly coupled to various component parts of the vehicle, for example sensors, actuators or the like. The closed-loop vehicle control device is configured to provide information to the closed-loop lighting system control device such that at least specific vehicle states are identifiable on the basis of this information.

In the present case, the lighting mode can be understood to mean a mode of the lighting system in which light output by the at least one lighting system lamp device is possible as a matter of principle. The lighting system is operational in the lighting mode, to be precise in view of being able to illuminate the at least one work region on the basis of the at least one lamp device.

Optionally, the vehicle state information may comprise in particular an ignition status of the vehicle and a vehicle speed. This can ensure closed-loop control of the lighting system, especially in view of the actual use and/or movement of the vehicle, with the result that an influence on the user can assist their focus depending on the use and/or movement of the vehicle.

Control of the lighting system with respect to the use of the vehicle can be based on the ignition status of the vehicle. The vehicle ignition status is advantageously considered since the ignition status typically specifies whether a user is arranged within the vehicle. Detecting the vehicle ignition status is helpful in this respect, especially for defining the lighting mode.

The vehicle speed can be used as a measure of whether a vehicle user typically directs their attention to a vehicle surrounding, and hence the illumination of the at least one work region might assist the user's focus.

By preference, the closed-loop lighting system control device is configured to automatically terminate an illumination of the work region if, on the basis of the received vehicle state information, a vehicle movement at a vehicle speed above a predetermined first speed threshold value is identifiable by the closed-loop lighting system control device. Thus, a work region illumination is terminated automatically as soon as the vehicle moves at a vehicle speed greater than or equal to the first speed threshold value. In particular, this helps the user from being influenced by the lighting system when the vehicle moves accordingly, and the user directs their attention to the vehicle surround. Consequently, the user comfort is enhanced.

Alternatively, the closed-loop lighting system control device can also be configured to automatically terminate an illumination of the work region if, on the basis of the received vehicle state information, a vehicle movement is identifiable by the closed-loop lighting system control device, independently of the vehicle speed. According to this embodiment, a work region illumination is terminated automatically as soon as the vehicle is in motion. In particular, this prevents the user from being influenced by the lighting system when the vehicle moves, and the user directs their attention to the vehicle surrounding. Consequently, the user comfort may be enhanced.

In a further alternative, the closed-loop lighting system control device can also be configured to automatically terminate a work region illumination when the vehicle ignition status changes in a specific manner. For instance, provision can be made for an illumination to be prevented if the received vehicle information is inadmissible in respect of the ignition status or if the ignition status is unknown or undeterminable on the basis of the received vehicle information. Then, the user is assisted by maintaining focus.

In some embodiments, the at least one lamp device is arranged and configured such that an illuminance of at least 400 lux (lumens/$m^2$) is ensured for the at least one work region. Such a high illuminance corresponds to the conventionally chosen minimum illuminance for stationary work regions, for example in offices. Expressed differently, the lighting system ensures a lighting intensity corresponding to that of a stationary work environment. This enhances the user comfort, especially in the case of vision-based activities within the vehicle.

Optionally, at least one additional work region in the vehicle is illuminable by the at least one lamp device. This additionally enhances the user comfort. By preference, the at least one additional work region could comprise at least a region of an instrument panel and/or a steering device or could be defined by such a region in respect of its spatial arrangement.

As an alternative to that or in addition, further work regions defined by the first and/or further vehicle rows can be illuminable by the lighting system. This once again enhances the user comfort.

Optionally, the lighting system comprises at least one further lamp device. As a result, a needs-based arrangement of the lighting system lamp devices can be chosen such that shadows within the at least one work region are reduced. As an alternative to that or in addition, a needs-based arrangement of the lighting system lamp device can also be chosen such that the user's preferred lighting is maintained comfortably.

By preference, the lighting system may comprise a plurality of lamp devices and the lamp devices may be arranged such that shadowing is minimized (optimized) within the at least one work region. As an alternative to that or in addition, a needs-based arrangement of the lighting system lamp device can also be chosen such that the user's comfort is maintained.

Optionally, the at least one lighting system lamp device is arranged such that a light beam emitted by the at least one lamp device is prevented from shining directly into an eye of a user in the first vehicle row, at least to the extent where the user adopts a conventional position within the first vehicle row.

In some embodiments, the lamp devices can ensure different illuminances. As a result, the illuminance within the at least one work region can be matched to the arrangement of the lamp devices.

Should the first vehicle row have a plurality of work regions, the lighting system can preferably be configured on the basis of the at least one lamp device to illuminate the plurality of first vehicle row work regions symmetrically. For instance, the plurality of work regions may correspond to a work region assigned to a driver's place and a workplace assigned to a front passenger's place. Then, the lighting system can ensure a symmetric lighting pattern of the work regions arranged next to one another. This provides an equal user comfort for all users in the first vehicle row.

Alternatively, a single workplace which is symmetrically illuminable by the lighting system in respect of the lateral extent (across the vehicle longitudinal axis) might also be defined by the driver's place and the front passenger's place.

Optionally, the illuminance ensured by various lighting system lamp devices can be adaptable depending on the illuminated portion of the vehicle interior. In particular, it is possible to ensure an illuminance adaptation by the closed-loop lighting system control device. An illuminance modification ensured by various lighting system lamp devices allows a reduction and in particular minimization of shadows within a specific portion of the vehicle interior. The user comfort is thus additionally enhanced.

The lighting system comprises a human machine interface in some embodiments. Then, the lighting system is configured such that, in the lighting mode of the lighting system, an illumination of the at least one work region by the at least one lamp device is re-activatable on the basis of a user input received by the human machine interface. This means that the illumination of the at least one work region can be ensured repeatedly even after automated termination. This only requires a user input which may enhance the user comfort.

By preference, an illumination of the at least one work region is only re-activatable if, on the basis of vehicle state information received by the closed-loop lighting system control device, a vehicle speed of the vehicle less than a predetermined second speed threshold value is identifiable. This advantageously ensures that a user is not influenced by an illumination of the at least one work region for as long as the vehicle is moving faster than the second speed threshold value. This may lead to an additional enhancement in the user comfort.

Optionally, the first speed threshold value and the second speed threshold value can be the same. Alternatively, the first speed threshold value and the second speed threshold value can be different, whereby consideration can be given to a hysteresis.

Optionally, a corresponding user input by the human machine interface can be prevented for as long as no vehicle speed that is less than the second speed threshold value is identifiable.

In an alternative, a corresponding user input by the human machine interface may have no consequence provided a vehicle speed that is less than the second speed threshold value is not identifiable.

In a further alternative, a user input by the human machine interface may be prevented or have no consequence unless the vehicle coming to a standstill is identifiable on the basis of the received vehicle state information. In some embodiments, a vehicle standstill and/or a vehicle movement is identifiable in particular on the basis of the vehicle state information, which in this respect may indicate a vehicle speed, received by the closed-loop lighting system control device.

Optionally, the lighting mode of the lighting system is activatable on the basis of a user input received by the human machine interface and/or on the basis of vehicle state information received by the closed-loop lighting system control device. In this context, the vehicle state information may specify a vehicle ignition status. This creates the option of putting the lighting system into a specific lighting mode either on the basis of a manual user input or, automatically, on the basis of received vehicle state information. This may enhance the user comfort.

According to one embodiment, the lighting system comprises an activated lighting mode provided a vehicle ignition is activated (activated ignition status). In an alternative embodiment, or in addition, the lighting system comprises an activated lighting mode provided a vehicle ignition is deactivated (deactivated ignition status). In a further alternative to that or in addition, the lighting system comprises an activated lighting mode provided the vehicle has a switched-on motor. The vehicle state information may thus also specify a motor state of the vehicle.

In the activated lighting mode, the lighting system may be configured to enable an illumination of the at least one work region. This means that the illumination of the at least one work region is able to be initiated in the activated lighting mode. An appropriate user input, for example, may be required to actually trigger the illumination.

In an alternative, the illumination of the at least one work region can be initiated automatically in the activated lighting mode. This means that the illumination of the at least one work region is ensured as soon as the lighting mode is activated. This additionally may enhance the user comfort.

For example, a light emission of the at least one lamp device can be prevented or allowed by the closed-loop lighting system control device on the basis of the following state table 1:

| Line | Ignition status of the vehicle | Vehicle speed | Light emission |
|---|---|---|---|
| 1 | Unknown | Independent thereof | Prevented |
| 2 | Inadmissible signal | Independent thereof | Prevented |
| 3 | Activated OR initiation OR user input | v ≥ 4 km/h | Prevented |
| 4 | Activated OR initiation OR user input | v < 4 km/h | Permitted |
| 5 | Deactivated | Independent thereof | Permitted |

State Table 1: Overview of the Light Emission Depending on the Ignition Status of the Vehicle and the Vehicle Speed The state table 1 shows that according to lines 1 and 2 a light emission by the at least one lighting system lamp device is prevented because the vehicle state information received by the closed-loop lighting system control device indicates an unknown or inadmissible ignition status of the vehicle. Thus, an illumination of the at least one work region is prevented in that case because the lighting system has a deactivated lighting mode.

The state table 1 also shows that according to line 3 a light emission by the at least one lighting system lamp device is prevented because although the vehicle state information received by the closed-loop lighting system control device indicates an activated ignition status of the vehicle, alternatively indicates an initiation of the vehicle ignition, or further alternatively indicates an appropriate user input, the received vehicle state information additionally indicates a vehicle speed of 4 km/h or more. In this case, the first speed threshold value is 4 km/h. In that case, the lighting system has an activated lighting mode but light emission is prevented because the vehicle speed is greater than or equal to the first speed threshold value. If the illumination is in fact initiated first and the actual vehicle speed only exceeds the first speed threshold value at a later time, then this leads to an automatic termination of the illumination. Thus, an illumination of the at least one work region is prevented in that case. Thus, the user's focus is maintained.

The state table 1 further shows that according to line 4 a light emission by the at least one lighting system lamp device is allowed because, firstly, the vehicle state information received by the closed-loop lighting system control device indicates an activated ignition status of the vehicle, alternatively indicates an initiation of the vehicle ignition, or further alternatively indicates an appropriate user input, and, secondly, the received vehicle state information additionally also indicates a vehicle speed of less than 4 km/h (less than the first speed threshold value). Thus, an illumination of the at least one work region is allowed in that case. Thus, the user comfort can be enhanced in this activated lighting mode of the lighting system.

The state table 1 additionally shows that according to line 5 a light emission by the at least one lighting system lamp device is allowed because the vehicle state information received by the closed-loop lighting system control device indicates a deactivated ignition status of the vehicle. Thus, an illumination of the at least one work region is allowed in that case, independently of the received vehicle state information indicating a vehicle speed below a predetermined threshold value. If a deactivated ignition status is determined, then the lighting mode of the lighting system is activated independently of the vehicle speed. This can enhance the user comfort.

In particular, the closed-loop lighting system control device can be configured in particular to ensure the states of the state table 1.

Optionally, the activated lighting mode of the lighting system can also be deactivatable on the basis of the received vehicle information. For instance, the received vehicle information may comprise a charge state of an energy storage device in the vehicle. In that case, the vehicle information might indicate a low energy storage device charge state. As a consequence, the activated lighting mode of the lighting system can be deactivatable by the closed-loop lighting system control device should the energy storage device charge state drop below a charge threshold value. This can ensure that the lighting system does not reduce the charge state of the energy storage device in the vehicle.

According to a further aspect, some embodiments also relate to a method for operating a lighting system for a vehicle. The lighting system comprises at least one lamp device arranged in the region of an interior roof lining of the vehicle. The lighting system comprises a closed-loop lighting system control device which is coupled to a closed-loop vehicle control device of the vehicle. The method includes at least the following steps:

A work region defined by at least a first vehicle row of the vehicle is illuminated in a lighting mode of the lighting system.

Vehicle state information is transmitted from the closed-loop vehicle control device to the closed-loop lighting system control device.

The illumination of the at least one work region is terminated automatically in the lighting mode of the lighting system on the basis of the received vehicle state information.

The advantages obtained by the lighting system as explained herein are also ensured in corresponding fashion by the method as described herein.

The features explained above in respect of the lighting system device should be transferred accordingly to the method described herein.

According to a further aspect, some embodiments also relate to a vehicle having a lighting system as described herein. The advantages obtained by the lighting system as explained herein are also ensured in corresponding fashion by the vehicle as described herein.

In the sense of the present disclosure, vehicles may comprise at least partly electrically driven vehicles in particular. In particular, vehicles may comprise land vehicles, specifically inter alia all-terrain and road vehicles such as automobiles, buses, trucks and other commercial vehicles. Vehicles can be manned or unmanned. In addition to pure electric vehicles (BEV), hybrid electric vehicles (HEV) and plug-in hybrids (PHEV) may also be encompassed.

All features explained in view of the various aspects are combinable with other aspects, either individually or in (sub-) combinations.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A lighting system for a vehicle, the lighting system comprising:

at least one lamp device arranged in a region of an interior roof lining of the vehicle such that at least one work region defined by at least a first vehicle row of the vehicle is illuminable by the at least one lamp device; and a closed-loop lighting system control device which is coupled to a closed-loop vehicle control device of the vehicle and configured to receive vehicle state information from the closed-loop vehicle control device, wherein the lighting system is configured, in a lighting mode of the lighting system, to automatically terminate an illumination of the at least one work region by the at least one lamp device on the basis of received vehicle state information, and wherein the closed-loop lighting system control device automatically terminates the illumination of the at least one work region if, on the basis of the received vehicle state information, a vehicle speed of the vehicle greater than a predetermined first speed threshold value is identifiable by the closed-loop lighting system control device.

2. The lighting system of claim 1, wherein the at least one lamp device is arranged and configured such that an illuminance of at least 400 lux is ensured for the at least one work region.

3. The lighting system of claim 1, wherein at least one additional work region in the vehicle is illuminable by the at least one lamp device.

4. The lighting system of claim 1, wherein the lighting system comprises a human machine interface, wherein the lighting system is configured such that, in the lighting mode of the lighting system, an illumination of the at least one work region by the at least one lamp device is re-activatable on the basis of a user input received by the human machine interface.

5. The lighting system of claim 4, wherein the illumination of the at least one work region is only re-activatable if, on the basis of vehicle state information received by the closed-loop lighting system control device, a vehicle speed of the vehicle less than a predetermined second speed threshold value is identifiable.

6. The lighting system of claim 4, wherein the lighting mode of the lighting system is activatable on the basis of a user input received by the human machine interface and/or on the basis of received vehicle state information.

7. The lighting system of claim 6, wherein the lighting mode is deactivatable on the basis of received vehicle state information.

8. The lighting system of claim 1, wherein the received vehicle state information includes an ignition status of the vehicle.

9. A vehicle comprising:

an interior roof lining having a region;

a first vehicle row defining a work region defined by at least the first vehicle row of the vehicle;

a closed-loop vehicle control device; and a lighting system comprising:

a lamp device arranged in the region of an interior roof lining of the vehicle such that a work region is illuminable by the lamp device; and a closed-loop lighting system control device which is coupled to the closed-loop vehicle control device of the vehicle and configured to receive vehicle state information from the closed-loop vehicle control device, wherein the lighting system is configured, in a lighting mode of the lighting system, to automatically terminate an illumination of the work region by the lamp device on the basis of received vehicle state information, and wherein the closed-loop lighting system control device automatically terminates the illumination of the work region if, on the basis of the received vehicle state information, a vehicle speed of the vehicle greater than a predetermined first speed threshold value is identifiable by the closed-loop lighting system control device.

10. The vehicle of claim 9, wherein the lamp device is arranged and configured such that an illuminance of at least 400 lux is ensured for the work region.

11. The vehicle of claim 9, wherein at least one additional work region in the vehicle is illuminable by the lamp device.

12. The vehicle of claim 9, wherein the lighting system comprises a human machine interface, wherein the lighting system is configured such that, in the lighting mode of the lighting system, an illumination of the work region by the at least one lamp device is re-activatable on the basis of a user input received by the human machine interface.

13. The vehicle of claim 12, wherein the illumination of the work region is only re-activatable if, on the basis of vehicle state information received by the closed-loop lighting system control device, a vehicle speed of the vehicle less than a predetermined second speed threshold value is identifiable.

14. The vehicle of claim 12, wherein the lighting mode of the lighting system is activatable on the basis of a user input received by the human machine interface and/or on the basis of received vehicle state information.

15. The vehicle of claim 14, wherein the lighting mode is deactivatable on the basis of received vehicle state information.

16. The vehicle of claim 9, wherein the received vehicle state information includes an ignition status of the vehicle.

17. A method for operating a lighting system for a vehicle, wherein the lighting system comprises at least one lamp device arranged in a region of an interior roof lining of the vehicle, wherein the lighting system comprises a closed-loop lighting system control device which is coupled to a closed-loop vehicle control device of the vehicle, the method comprising the following steps:

illuminating at least one work region defined by at least a first vehicle row of the vehicle in a lighting mode of the lighting system;

transmitting vehicle state information from the closed-loop vehicle control device to the closed-loop lighting system control device; and automatically terminating the illumination of the at least one work region by the at least one lamp device in the lighting mode of the lighting system on the basis of the received vehicle state information, wherein the closed-loop lighting system control device automatically terminates the illumination of the at least one work region if, on the basis of the received vehicle state information, a vehicle speed of the vehicle greater than a predetermined first speed threshold value is identifiable by the closed-loop lighting system control device.

18. The method of claim 17, wherein the at least one lamp device is arranged and configured such that an illuminance of at least 400 lux is ensured for the at least one work region.

19. The method of claim 17, wherein the lighting system comprises a human machine interface, wherein the lighting system is configured such that, in the lighting mode of the lighting system, an illumination of the at least one work region by the at least one lamp device is re-activatable on the basis of a user input received by the human machine interface.

20. The method of claim 17, wherein the received vehicle state information includes an ignition status of the vehicle.

* * * * *